Figure 16:
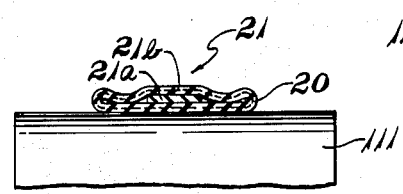

Jan. 31, 1956 M. KUTS 2,732,882
METHOD OF BUILDING CONTINUOUS TUBING AND APPARATUS THEREFOR
Filed Sept. 30, 1952 4 Sheets-Sheet 1

INVENTOR
Mathew Kuts
By Dwight L. Moody
Atty

Jan. 31, 1956  M. KUTS  2,732,882
METHOD OF BUILDING CONTINUOUS TUBING AND APPARATUS THEREFOR
Filed Sept. 30, 1952  4 Sheets-Sheet 2

Inventor
Mathew Kuts
By Dwight L. Moody
Atty

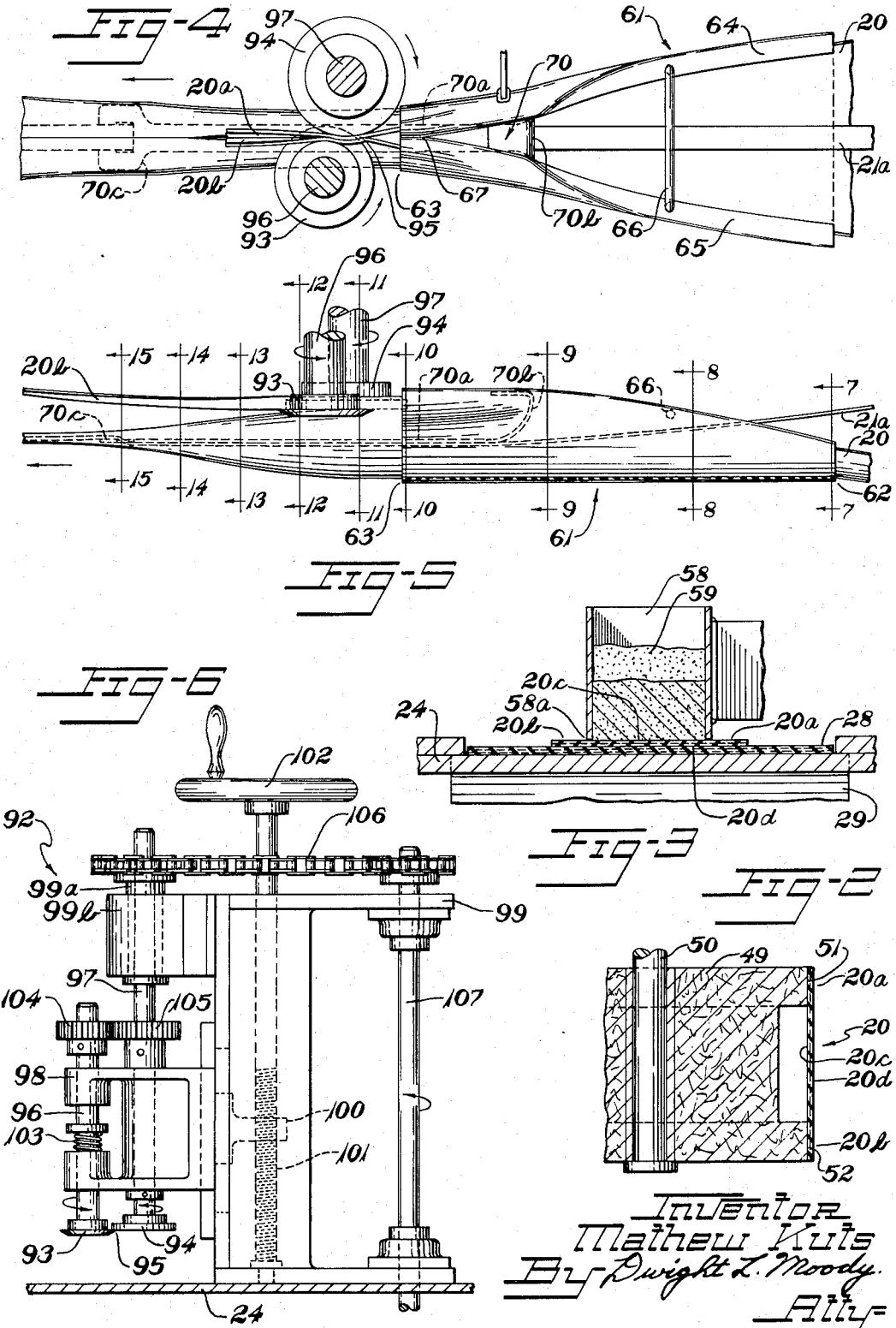

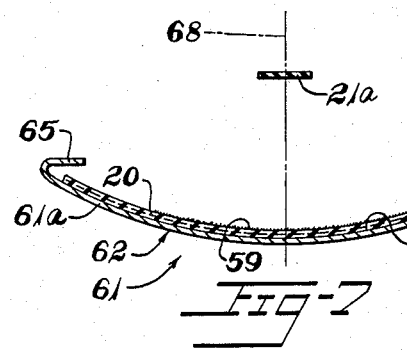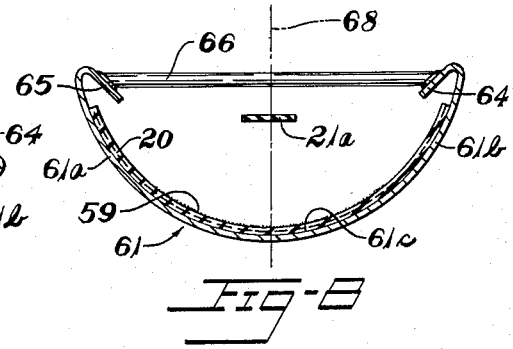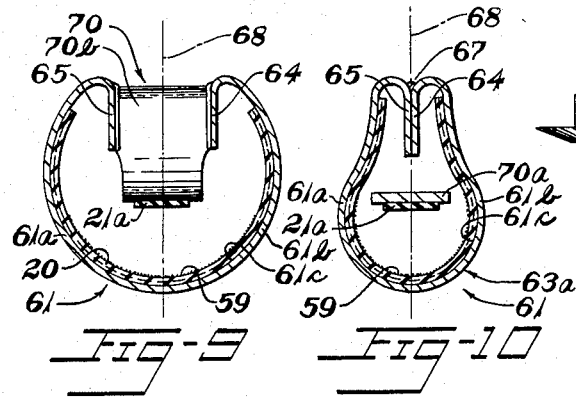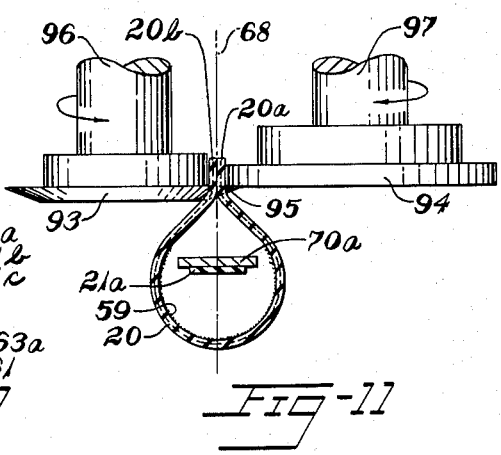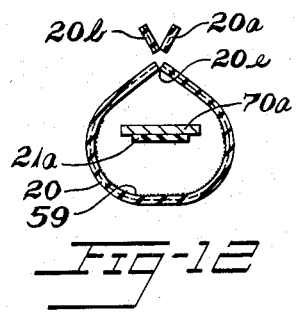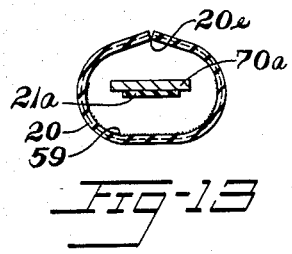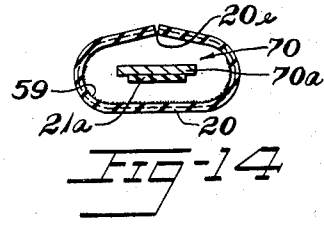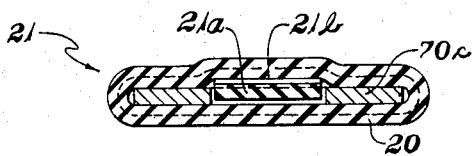

United States Patent Office 2,732,882
Patented Jan. 31, 1956

2,732,882

METHOD OF BUILDING CONTINUOUS TUBING AND APPARATUS THEREFOR

Mathew Kuts, Akron, Ohio, assignor to The B. F. Goodrich Company, New York, N. Y., a corporation of New York Application September 30, 1952, Serial No. 312,243

15 Claims. (Cl. 154—1.6)

The invention relates to methods of and apparatus for building continuous tubing of self-adherent material, and especially to the manufacture of continuous tubing from continuous strips of vulcanizable rubber-like sheet material which tubing subsequently may be severed into lengths and formed, for example, into closed end inflatable tubes for ice-removing coverings for aircraft and other exposed surfaces.

Heretofore, inflatable tubes suitable for assembly into ice-removing, thin rubber coverings or shoes for aircraft, have been made by hand using strips of desired length and width to provide tubes of the required length and diameter. The strips have been cut by hand or by machine from thin sheet material made generally of woven textile fabric thinly coated on both faces with unvulcanized resilient natural rubber composition. Overall and substantially uniform thinness are highly important in the inflatable tubes in flattened deflated condition; hence a seam formed of circumferentially overlapping marginal portions of the strip in overlying face-to-face adhered relation is too bulky for the purpose. For this reason the strips have been folded by hand so as to form a longitudinally-seamed, flattened tube with the side edges of the strips in abutment to provide a butt joint along the longitudinal seam. The butt joint has been generally reinforced by a narrow tape of suitable extra thin fabric and rubber material, the tape being applied by hand and adhered to the inside or to the outside of the tube, to strengthen the joint against separation especially during handling of the tube in its assembly into the covering.

The hand method of making the tube has been costly, and has produced tubes lacking uniformity of diameter and lacking good adherence of the joined edges constituting the longitudinal butt-joint. The tube-forming strips whether cut by hand or machine, have not been of the desired uniformity of width, and consequently produce tubes of non-uniform diameter. The unevenness of the cut-edges of the strip has made it difficult to provide continuity of abutting contact along the edges, and thus there is objectionable weakness of the butt-joint. Also, the hand-building procedure introduces considerable difficulty in folding the strips to form tubes of relatively small diameter such, for example, as about ¾ inch diameter.

An object of the invention is to provide for overcoming the foregoing and other difficulties of making inflatable tubes.

Other objects of the invention are to provide improved apparatus for rapidly, automatically and economically building a longitudinally-seamed tube or tubing in continuous strip form; to provide improved procedure for making the tube or tubing; to provide for uniformity of diameter of the tubing; to provide for continuity and strength of a butt-joint along the tubing; to provide for accurately making tubing in a relatively wide range of diameters; to provide for applying reinforcing tape to the inside or the outside surface of the tubing while forming the latter; to provide for automatically making tubing of relatively thin, extensively flexible, self-adherent material such, for example, as unvulcanized rubber-like material in strip form; and to provide for simplicity of construction, convenience and economy of manufacture, and for effectiveness of operation.

These and other objects and advantages of the invention will be apparent from the following description.

Figure 17:
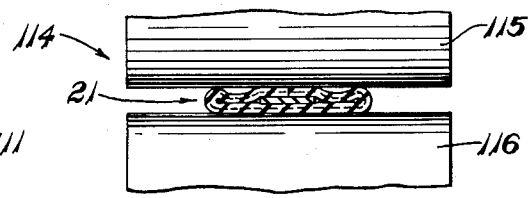
Figure 18:
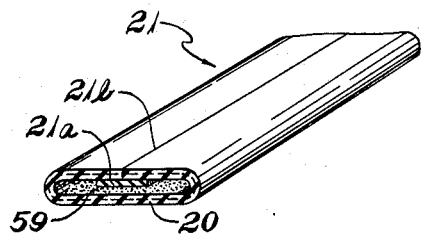
Figure 19:
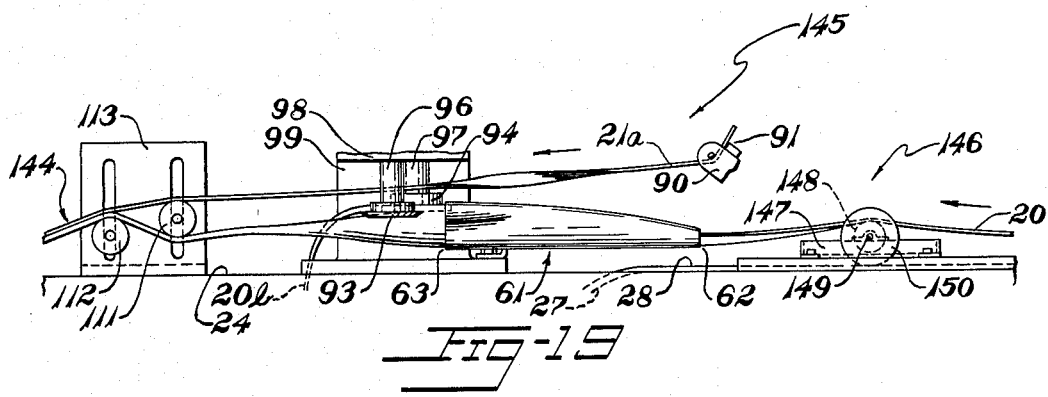
Figure 20:
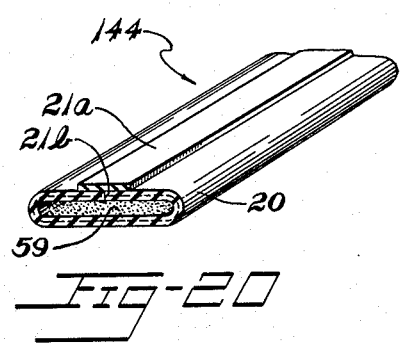
Figure 1:
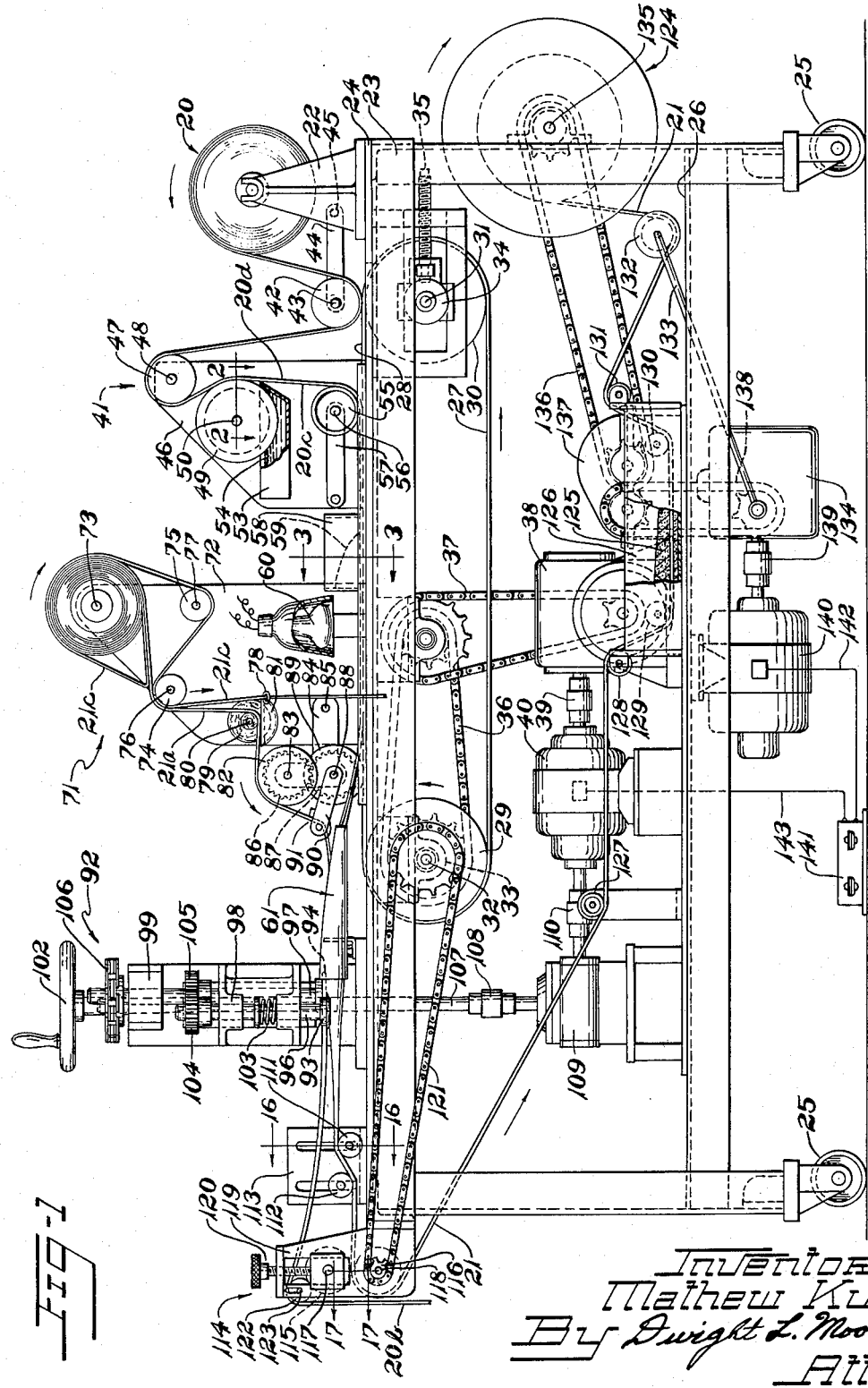

In the accompanying drawings which form a part of this specification and in which like numerals are employed to designate like parts throughout the same, Fig. 1 is a side elevational view of apparatus for automatically building a continuous tube or tubing of continuous strip material and constructed in accordance with and embodying the invention, parts being broken away and in section, Fig. 2 is a sectional view in an enlarged scale taken along line 2—2 of Fig. 1 showing rotatable means applying liquid solvent to opposite margins of tube-forming strip material, parts being broken away, Fig. 3 is a sectional view in an enlarged scale taken along line 3—3 of Fig. 1 showing means for applying adhesion-preventing powdered material to the strip material intermediate its opposite margins, parts being broken away, Fig. 4 is a plan view from above showing in an enlarged scale strip-folding means and strip-cutting means and tape-applying means of the apparatus shown in Fig. 1, parts being in section and broken away, Fig. 5 is a side elevational view of the means shown in Fig. 4, parts being broken away, Fig. 6 is an elevational view of the strip-cutting means and its associated adjusting and driving mechanisms as viewed toward the left hand end of the apparatus with the strip-folding means removed, parts being broken away and in section, Fig. 7 is a sectional view in an enlarged scale taken along line 7—7 of Fig. 5, Fig. 8 is a sectional view in an enlarged scale along line 8—8 of Fig. 5, Fig. 9 is a sectional view in an enlarged scale taken along line 9—9 of Fig. 5, Fig. 10 is a sectional view in an enlarged scale taken along line 10—10 of Fig. 5, Fig. 11 is a sectional view in an enlarged scale taken along line 11—11 of Fig. 5, Fig. 12 is a sectional view in an enlarged scale taken along line 12—12 of Fig. 5, Fig. 13 is a sectional view in an enlarged scale taken along line 13—13 of Fig. 5, Fig. 14 is a section view in an enlarged scale taken along line 14—14 of Fig. 5, Fig. 15 is a sectional view in a greatly enlarged scale taken along line 15—15 of Fig. 5, Fig. 16 is a sectional view in an enlarged scale taken along line 16—16 of Fig. 1 showing a tape reinforcement applied to the inside of the tube, parts being broken away, Fig. 17 is a sectional view in an enlarged scale taken along line 17—17 of Fig. 1 showing the tube of strip material and its inside tape reinforcement passing between pressure-applying rolls of seam-rolling or compacting means of the apparatus, parts being broken away, Fig. 18 is a perspective view of the completed tube of strip material as built by the apparatus shown in Figs. 1 to 17, inclusive, parts being broken away and in section, Fig. 19 is a side elevational view showing a modified construction of the apparatus shown in Fig. 1 and adapted for applying a reinforcing tape to the outside of the tube, parts being broken away, and Fig. 20 is a perspective view like Fig. 18, but showing the completed tube as built by the modified apparatus.

The apparatus or machine shown in Figs. 1 to 17 is suitable for the manufacture of a continuous tube or tubing 21 from a continuous strip or band 20 of self-adherent material such, for example, as vulcanizable sheet material of natural or synthetic rubber, or rubber-like material or synthetic material having substantially similar chemical composition or physical properties to natural rubber and to the equivalents therefor. The apparatus is designed especially for continuously advancing and progressively, that is continuously folding, trimming and butt-seaming a thin, continuous strip 20 to produce a longitudinally-seamed continuous tube or tubing 21 and for progressively, that is continuously applying a continuous strap or tape reinforcement 21a along the seam of the tube, the continuous strip 20 being thin, extensively flexible sheet material made of woven or knitted or other suitable textile fabric of nylon, rayon, cotton, silk, linen or other suitable filamentary material, rendered impervious as by calendering a thin coating of unvulcanized resilient rubber-like composition on one or both faces of the sheet of fabric. Such a continuous tube or tubing of fabric and rubber-like composition construction is produced automatically and accurately by the apparatus and is suitable especially for severing into lengths so as to make closed end inflatable tubes for ice-removing coverings for aircraft surfaces and other surfaces subject to ice-forming conditions.

A preferred construction of the continuous tube or tubing 21 for inflatable tube purposes has the continuous strip or band 20 for forming the tube made of square-woven, straight or bias-laid, nylon fabric of about 0.010 inch thickness coated on each face with a layer of unvulcanized, resilient, natural rubber composition of about 0.005 inch thickness so that the coated fabric has an overall thickness of about 0.020 inch. The tape reinforcement 21a may be a relatively narrow ribbon of suitably woven cotton fabric of about 0.0035 inch thickness coated on one face only with suitable unvulcanized, resilient, natural rubber composition of about 0.005 inch thickness so that the tape or ribbon has an overall thickness of about 0.0085 inch. The rubber-coated, continuous nylon strip 20 may have a very thin outer coating on the rubber composition of an adhesion-preventing powder such, for example, as zinc stearate capable of being absorbed in the rubber composition during vulcanization, and the strip may be wound in convolutions to form a roll, the zinc stearate preventing adhesion of the convolutions one to the other. The tape may be supplied in roll form with a starched fabric continuous separator (Holland cloth) 21c for preventing adhesion of the tape convolutions one to the other. Material of such thinness and extensive flexibility is suitable for making inflatable tubes of uniform diameter within the range of ¼" to about 3" diameter; but presents difficulties in folding and seaming the material by machine operations so as to provide a secure, edge-on, abutment seam longitudinally of the tube and provide uniformity of diameter along the tube. However, these difficulties are overcome effectively by the apparatus of the invention.

In the particular apparatus shown in Figs. 1 to 17, the continuous strip or band 20 of suitable rubber-coated, woven nylon fabric which susequently forms the continuous tube or tubing 21, is supplied in roll form and has a width greater than the circumference of the desired tube size. The roll of strip material 20 may be detachably mounted for rotation on spaced-apart pedestals 22, 22 fixedly secured to a supporting frame 23 at one end thereof so that the pedestals 22 project upwardly from a flat top shelf 24 of the frame 23. The frame 23 may be formed of suitable metal material providing sufficient strength and rigidity to support the operative mechanisms of the apparatus; may be mounted on swiveled caster wheels 25, and may have a lower shelf 26.

The top shelf 24 is cut-away to accommodate strip-transporting and moving or advancing means such, for example, as a flat conveyor belt 27 of reinforced rubber construction and greater width than the strip 20, which belt is arranged with its flat upper reach 28 substantially flush with the upper surface of the top shelf 24 and extending from a receiving position adjacent the pedestals 22, 22 to a delivery position spaced from the other end of the supporting frame 23.

The conveyor belt 27 is trained about spaced-apart pulleys 29, 30 mounted for rotation on shafts 31, 32 carried by bearing mountings 33, 34 secured to the frame 23, the driven pulley 30 being slidably adjusted as by screw-type adjusting means 35 for belt-tensioning purposes. The driving pulley 29 is driven by chain and sprocket wheel drives 36, 37 supported by the frame 23 and operatively connected with a suitable speed reducer 38 secured to the lower shelf 26, the speed reducer 38 being operatively connected by shaft and coupling means 39 to an electric motor 40 above and carried by the lower shelf 26. The conveyor belt is driven at a substantially uniform rate of speed which, for example, may be about 15 feet per minute.

The conveyor belt is utilized to facilitate drawing the strip 20 from the roll and feeding the strip to solvent-applying means 41 of the apparatus. To this end, there is provided a cylindrical roller 42 mounted to overlie the driven pulley 30 adjacent the upper reach 28 of the belt 27 and supported for rotation on a shaft 43 carried by a link 44 pivotally mounted on a suitable bearing projection 45 carried by the pedestal 22. The arrangement provides for vertical swinging movement of the roller 42 with the movement of the conveyor belt and for drawing-off the strip 20 when the strip is passed from its roll underneath the roller 42, so that the roller by virtue of its weight and cantilever mounting, presses the strip 20 into frictionally driven contact with the belt 27. This facilitates feeding the strip 20 to the solvent-applying means 41 at a substantially uniform rate.

The solvent-applying means 41 has an upright mounting member 46 secured fixedly to the top shelf 24 adjacent the conveyor belt, which member 46 carries a cylindrical idler roll 47 rotatably supported on an axle 48 projecting from the member in overlying spaced-apart relation to the conveyor belt and to a solvent-applying wheel 49 of felt or other suitable wettable and absorbent material rotatably supported on an axle 50 carried by the member 46. The felt wheel 49 has its peripheral face circumferentially and centrally grooved as shown in Fig. 2 to provide laterally spaced-apart, peripherally-continuous surfaces 51, 52 of felt material and suitable width for contacting, wetting and cleaning spaced-apart marginal portions 20a and 20b of the strip 20 at a face 20c thereof, so as to enhance the self-adherent properties of the rubber-like material, which marginal portions are of sufficient width to permit severing parts thereof yet providing for making a continuous tube 21 of the desired diameter. The felt wheel 49 has its lower portion disposed within a shallow tray 53 supported by the member 46 and adapted to contain a liquid solvent and/or cleaning agent 54 such, for example, as benzene, naphtha and the like.

The peripheral felt surfaces 51, 52 under rotation of the wheel 49 are moistened throughout their extent by the benzene so as to apply the same substantially uniformly to the marginal portions 20a, 20b of the strip at its face 20c normally contacting the wheel at a peripheral side thereof, when the strip 20 is passed from beneath the drawing-off roller 42 over the idler roller 47 and partially about the wheel 49 to a cylindrical driving roller 55 overlying the conveyor belt 27. The roller 55 is mounted for rotation on an axle 56 carried at one end of a link 57 pivotally mounted at its other end on the member 46 for the vertical swinging movement of the driving roller 55 in accordance with movement of the conveyor belt 27 to facilitate good continuous contact of the strip 20 against the upper reach 28 of the belt.

The strip 20 is normally in a taut condition between the drawing-off roller 42 and the driving roller 55, and it will be noted, passes from the periphery of the solvent-applying wheel 49 partially about and beneath the driving roller 55 so that the face 20c of the strip 20 having the cleaned, moistened marginal portions 20a, 20b is uppermost relative to the upper reach 28 of the conveyor belt. The driving roller 55 by virtue of its weight and cantilever mounting, presses the other or under face 20d of the strip 20 throughout its width against the upper reach 28 of the conveyor belt so that the strip 20 is compelled to move with little or no slippage relative to the belt and to travel with the belt in supported relation thereto toward the delivery position of the conveyor.

There is provided means for applying or dusting or spreading adhesion-preventing powdered material 59 onto the face 20c of the strip across the middle and side portions thereof extending between the cleaned, moistened marginal portions 20a, 20b, the width of the strip 20 coated with the material 59 being slightly less than the internal circumference of the desired continuous tube. Such means may be a hopper or other suitable container 58 fixedly secured to the top shelf 24 of the frame 23 in overlying spaced-apart relation to the strip 20 and to the upper reach 28 of the belt at a position beyond the solvent-applying means 41 and toward the delivery position of the conveyor belt. The delivery mouth 58a of the hopper 58 is closely adjacent the face 20c of the strip 20, as shown especially in Fig. 3, to apply a thin layer of the adhesion-preventing powder 59 across the strip's face 20c but slightly short of its cleaned marginal portions 20a, 20b. The adhesion-preventing powdered material 59 may be soapstone and the like which has the advantage of not being absorbed by the rubber material of the strip 20 during vulcanization, and serves to prevent bonding together overlapping portions of the strip 20 in its flattened tubular form 21 during vulcanization.

For facilitating drying and further enhancing the self-adherent properties of the cleaned, moistened marginal portions 20a, 20b of the strip there may be provided heating means such as shrouded electric heat lamp 60 of the infra-red ray type suitably mounted on the frame 23 in overlying spaced-apart relation to the strip and to the conveyor belt. The heating effected by the infra-red ray lamp 60 dries the liquid solvent on the marginal portions 20a, 20b and promotes tackiness and self-adherence of the rubber material of such portions at the face 20c of the strip 20.

It will be noted that the strip 20 is fully supported in a flat condition by the upper reach 28 of the conveyor belt and travels with the conveyor belt from the driving roller 55 beneath the hopper 58 and the infrared ray lamp 60 to the delivery position of the conveyor belt, where the strip is delivered to forming or folding means 61 for forming and folding the strip 20 progressively to produce subsequently the continuous tube 21.

The forming or folding means 61 of the invention comprises an elongate shaping and folding structure of stiff material, desirably sheet metal, having a troughed strip-shaping surface 61c of generally and laterally curved configuration in cross-section from its wide strip-receiving end or mouth 62 to substantially its relatively narrower strip-delivery end 63, the structure 61 terminating at the narrower end 63 in a continuously annular end portion 63a having in part a circular configuration in cross-section, as shown especially in Figs. 4, 5 and 10. The elongate shaping and folding structure 61 gradually tapers and progressively increases in sharpness of curvature in cross-section from its wide strip-receiving end 62 along the upwardly curved sides 61a, 61b to the narrower strip-delivery end 63 for progressively and laterally inwardly folding the strip 20 at its side marginal portions. The internal width dimension of the folding structure 61 at its wide strip-receiving end 62 is at least equal to and desirably slightly greater than the width of the flat strip 20 to facilitate the initial entry of the strip into the folding structure. The internal diameter of the circular end portion 63a of the structure 61 at the strip-delivery end 63 is approximately equal to the outside diameter of the desired finished tube or tubing 21 in a circular condition.

The metal material of the upwardly curved sides 61a, 61b of the shaping and folding structure 61 is inwardly and downwardly bent at the tops of the sides to form therewith guide portions 64, 65 of inverted generally U-shape in cross-section to provide generally U-shaped channels for receiving and guiding and bending the marginal portions 20a, 20b of the strip 20. The curved sides 61a, 61b may be braced against spreading by a lateral strut 66 secured to the guide portions 64, 65 intermediate the ends 62, 63, and the guide portions at the strip-delivery end 63 are attached to one another in a vertical side-by-side disposition as by a fused metal or soldered or brazed attachment 67.

The inverted U-shaped guide portions 64, 65 at the strip-receiving end 62 have initially a steeply inclined disposition relative to a vertical plane 68 extending along and intersecting the longitudinal center line of the shaping and folding structure, as shown in Fig. 7, and progressively decrease in inclination relative to the vertical plane 68 from the mouth end 62 toward the delivery end 63, as shown in Figs. 8 and 9. That is, the guide portions 64, 65 extend in a helical or twisted manner along the structure 61, in accordance with the increase in sharpness of curvature in cross-section of the sides of the structure, so that at the strip-delivery end 63 the attached guide portions 64, 65 abut one another at and in parallel relation to the vertical plane 68 and project radially outward and vertically upward relative to and in continuation of the circular part of the end portion 63a of the structure, as shown in Fig. 10. The shaping and folding structure 61 is suitably supported as shown in Fig. 1 so as to have its bottom slightly above and approximately parallel to the horizontal plane of the upper reach 28 of the belt 27 with the strip-receiving end 62 adjacent and vertically spaced from the delivery position of the conveyor belt 27, as shown in Fig. 1.

The arrangement advantageously facilitates the structure 61 receiving the flat strip 20 from the delivery position of the conveyor belt 27 without requiring abrupt longitudinal flexure and lateral curvature of the strip 20 at the strip-receiving end 62. At the same time, the arrangement has provision for progressively upwardly curving and inwardly folding the strip 20 up on itself so as to progressively bend and move the marginal portions 20a, 20b tacky face 20c first laterally inward toward one another and also upwardly to a vertical disposition substantially parallel with the vertical plane 68. Moreover, the shaping and folding structure 61 compels change of the strip 20 from its flat shape on the upper reach 28 of the conveyor belt to a divided tubular or circular shape with radially outward extensions at the strip-delivery end 63 of the structure. At this end 63, part of the cleaned and tacky surfaced marginal portions 20a, 20b project radially outward and upward in closely adjacent, substantially parallel, face 20c-to-face 20c relation one to the other, while the intervening middle and side portions of the strip 20 constitute the circular portion of the strip 20 in its changed tubular condition. Thus, it will be noted, that the strip 20 is progressively, that is continuously discharged in the form of a continuous cylinder divided longitudinally at the region of the outwardly disposed marginal portions 20a, 20b.

When the continuous tube 21 formed from the strip 20 is to have a continuous tape reinforcement 21a internally along the longitudinally-extending butt-seam 21b of the tube, the invention provides tape-applying and/or inserting means 70 coacting with the shaping and folding structure 61 for threading and progressively feeding and applying the tape 21a centrally into the space of the tube. The tape-applying and/or inserting means includes an elongate threading element 70 constructed preferably of stiff, flat, metal strip material, although not necessarily limited thereto, and desirably fixedly mounted on the structure 61. The threading element 70 extends within the troughed space of the structure 61 from a position located substantially in advance of the strip-delivery end 63 along and in alignment with the longitudinal center line of the structure 61 to a position located substantially beyond the end 63, and is arranged to pass through approximately or slightly above the center of the circle of the circular portion 63a at the strip-delivery end 63, as shown in Fig. 10, to position the tape 21a about centrally of the strip 20 in its tubular or cylindrical condition at the end 63.

The threading element 70 may have a flat, straight, tape-registering body 70a for overlying the tape 21a with an upwardly curved end portion 70b at the position in advance of the end 63 for smoothly guiding the tape into the troughed space of the structure 61, and terminates at the position beyond the end 63 in a flat, relatively wide, flared end portion 70c for facilitating changing the initial circular form of the strip 20 at the end 63 to a relatively less circular or partially flattened form, which end portion 70c has a lateral tape-threading or positioning slot therethrough. The overall width of the slotted end portion 70c is substantially equal to but not exceeding the internal width of the desired continuous tube 21 in a flattened condition, as shown in Fig. 15. The threading element 70 may be suitably secured fixedly at its upwardly curved end portion 70b to the U-shaped guide portions 64, 65 of the structure 61, and functions to register the tape substantially centrally and longitudinally of the troughed space of the structure 61 and of the continuous tube 21. This facilitates the positioning the tape 21a in adhered relation to the internal surface of the continuous tube 21 substantially centrally along its longitudinal butt-seam 21b.

For supplying the continuous tape 21a to the threading element 70, there is provided tape-feeding means 71 supported by the frame 23 and disposed adjacent the conveyor belt between the infra-red ray lamp 60 and the strip-receiving end 62 of the shaping and folding structure 61, as shown in Fig. 1. The tape-feeding means 71 includes an upright mounting member 72 fixedly secured to the top shelf 24 of the frame 23. The mounting member 72 has at its upper region a laterally-projecting shaft 73 detachably mounting and rotatably supporting a roll of the tape. A pair of idler pulleys 74, 75 are rotatably mounted on axles 76, 77 carried by the mounting member 72 at positions spaced-apart relative to the shaft 73 and to one another, the pulley 74 being uppermost. The tape 21a as it is unwound from the lower region of the roll passes directly to and partially about the pulley 74. The Holland cloth separator 21c is removed from the tape adjacent the pulley 74 and passes upwardly about the roll of tape, and then downwardly to the lower pulley 75 and back to the upper pulley 74 from which the Holland cloth separator 21c passes downwardly through a wire guide 78 to a suitable receptacle (not shown) for retaining the separator material. This exposes the clean rubber surface of the tape.

Below and spaced forwardly of the upper pulley 74 is a wicking roll 79 of felt material and stepped construction mounted for rotation on a shaft 80 carried by the mounting member 72, and the wicking roll 79 normally rotates with its larger diameter portion partially submerged in benzene, for example, contained in a suitable metal container 81 mounted on the mounting member 72. The tape 21a passes downwardly from the upper roll 74 with the clean rubber surface of the tape in position to contact the small diameter portion of the wicking roll 79 so that the benzene absorbed by the felt moistens the clean rubber surface to assure its tackiness. The tape then passes over a tape-feeding wheel 82 with the moistened tacky rubber surface uppermost.

The tape-feeding wheel 82 may be made of spaced-apart circular plates secured and interconnected at their periphery by a series of circumferentially spaced-apart round metal rods for supporting the tape between the plates. The arrangement facilitates drawing-off the tape 21a from the roll as required, while permitting such slippage between the tape and the rods as may be required to accommodate variation in the rate of drawing the strip 20 through the tube-forming means 61 and cutter means 92, and variation in the rate of progressively forming the continuous tube 21 from the strip 20.

The wheel 82 is mounted for rotation on an axle 83 carried by the bell crank 84 at one end thereof, which bell crank is pivotally mounted at its other end on a pin 85 carried by the mounting member 72. The wheel 82 is positively driven and rotated by a pair of meshing spur gears 86, 87 having the gear 86 mounted on the axle 83 and secured to the wheel. The other gear 87 is mounted for rotation on an axle 88 also carried by the bell crank 84, and is secured to a driving roller 89 on the axle 88 having a knurled or other suitably roughened peripheral face adapted to ride upon the upper reach 28 of the conveyor belt. Desirably, the gear ratio is such that the peripheral speed of the tape-feeding wheel 82 is slightly greater than the speed of the conveyor belt so as to feed the tape 21a at a rate slightly in excess of that required by the travel of the strip 20, thereby providing for a continuous supply of tape to the threading element 70 without objectionable slackness of the tape. A lever 90 may be secured fixedly to the bell crank 84 and may have guide and pin means 91 for guiding the tape from the wheel 82 to the threading element 70 and the folding structure 61.

It will be noted that the tape 21a as supplied by the tape-feeding means 71 immediately underlies the threading element 70 at and beyond the strip-delivery end 63 of the structure 61, as shown in Figs. 11 to 14, inclusive, and then passes upwardly through the tape-positioning slot in the flared end portion 70c of the threading element 70 so that the clean, tacky surface of the tape 21a is uppermost and closely adjacent the longitudinal butt-seam 21b for disposition against the interior wall of the tube 21, as shown in Fig. 15.

However, at the end 63 of the structure 61, the strip 20, after the forming or folding operation, emerges in the form of a longitudinally divided cylinder of substantially circular cross-section with the marginal portions 20a, 20b projecting radially outward and upward from the cylinder at the divide in closely adjacent, face-to-face relation one to the other, as shown in Fig. 11. In view of this, there is provided adjustable cutter means 92 having preferably rotary cutters 93, 94 adjacent and longitudinally spaced from the strip-delivery end 63 of the structure 61 and overlying the threading element 70, as shown in Figs. 4 and 5, for continuously severing and seaming or pressing together the upstanding marginal portions 20a, 20b of the folded cylindrical strip 20 at a position thereon circumferentially thereof such as to provide the desired uniform diameter of the continuous tube 21.

The rotary cutters 93, 94 are desirably of disc shape with continuous, circular cutting edges at their peripheries. The cutters are arranged horizontally in laterally spaced-apart, longitudinally-offset and slightly tilted relation one to the other with peripheral portions including the cutting edges in superimposed overlapping relation. The cutting edges have point contact only at a position, indicated by the numeral 95, nearest the end 63 of the structure 61 and in alignment with the vertical plane 68 along the longitudinal centerline of the structure 61 and within the height of the upstanding, overlapping marginal portions of the strip, whereby the upstanding marginal portions 20a, 20b are simultaneously pressed together and severed at such point contact 95 of the cutting edges under rotation of the cutters. This shearing by the cutters produces uniformly cut outwardly facing marginal edges of the thin, flexible fabric and rubber material of both marginal portions of the strip 20 after the forming or folding operation, as shown in Fig. 12, the cut marginal edges being initially in the same horizontal plane. This shearing action also squeezes tightly together at such cut edges the tacky rubber material of the adjacent faces of the upstanding marginal portions 20a, 20b into firmly adhered, substantially line-contacting side-by-side relation at 20e along the cut-edges of the cylindrical part or portion of the strip 20, as shown in Fig. 12, and coinciding with the level of the point contact 95 of the cutting edges. Also, the severed upper parts of the marginal portions 20a, 20b are likewise adhered and brought together which upper parts are shown diverging in Fig. 12 for increased clarity of illustration.

The rotary cutters 93, 94 are mounted fixedly on the lower ends of shafts 96, 97 journaled for rotation in a bracket 98 slidably supported on a mounting assembly 99 secured to the top shelf 24 of the frame 23, as shown in Figs. 1 and 6. The bracket has a threaded projection 100 engaging a threaded adjusting shaft 101 journaled in the mounting assembly and rotated by a hand wheel 102 for vertical adjustment of the cutters and shafts 96, 97. The shaft 96 is axially movable relative to the bracket 98 and is urged upwardly by coiled spring means 103 so as to maintain the cutter 93 continuously and resiliently in contact with the other cutter 94 at the cutting point contact 95 for effective shearing of the thin strip 20. Spur gears 104, 105 on the shafts 96, 97 compel rotation of the shaft 96 and cutter 93. The other shaft 97 is keyed in a bearing sleeve 99a for relative axial sliding movement, the sleeve 99a being fixedly secured in a hollow projection 99b of the mounting assembly 99 and above the bracket 98, and extends above such projection 99b for connection to a chain and sprocket wheel drive 106 which is driven through a drive shaft 107 journaled in the mounting assembly 99 and operatively connected at its lower end through coupling means 108 to a speed reducer 109 carried by the lower shelf 26 of the frame 23. The speed reducer 109 is connected through a shaft and coupling means 110 to the electric motor 40, whereby the rotary cutters 93, 94 are positively rotated by virtue of the gear and chain-drive mechanism, at the desired speed for effectively trimming and seaming the strip 20 in its folded condition, as shown in Figs. 11 and 12.

It will be noted that immediately after the severance of the marginal portions 20a, 20b and at a position slightly beyond the cutting point 95, the generally cylindrical portion of the strip 20 has its line-joined cut-edges lying in the same horizontal plane. The generally cylindrical portion of the strip 20, as it and the tape 21a are drawn in a tensioned condition away from the cutters 93, 94, progressively changes from the circular to a lesser curved shape and then to a relatively flattened, tubular shape in cross-section, as shown in Figs. 13, 14 and 16. At the same time, the line-joined cut-edges progressively swing toward one another about the line of joinder 20e into adhered edge-to-edge abutting contact to form the butt-seam 21b, all by virtue of the pull on the folded strip 20 and the spreading force exerted on the folded strip 20 by the flared end portion 70c of the threading element 70.

The relatively flattened tubular strip 20 and the tape 21a therein pass away from the cutters 93, 94 under a slight tension and travel, as shown in Fig. 1, over an upper round pin or rotatable roller 111 and under a lower round pin or rotatable roller 112, so as to positively and progressively, that is continuously press the tape 21a tacky surface first into adhered contact with the tubular strip 20 along the tacky rubber interior surface thereof at the longitudinal butt-seam 21b, as shown in Fig. 16. The rollers 111, 112 are mounted for vertical adjustment on a support 113 secured to the top shelf 24 beyond and spaced from the threading element 70. Beyond the support 113 and rollers 111, 112 the invention provides seam-compacting means 114 which may be mounted on the frame 23 at the delivery end of the apparatus, as shown in Fig. 1.

The seam-compacting means 114 preferably includes a pair of vertically superimposed pressure-applying rolls 115, 116 mounted for rotation on shafts 117, 118 carried by laterally spaced-apart, interconnected mounting members 119, 119 secured to the frame 23. The upper roll 115 and shaft 117 are slidably mounted for vertical adjustment by screw adjusting means 120 toward and away from the fixedly mounted lower roll 116 and shaft 118, so as to establish the desired pressure exerted by the rolls on the flattened tubular strip 20 and tape 21a when the same are drawn between the rolls, for effecting the compacting of the butt-seam and the secure attachment of the abutting cut-edges of the tubular strip to one another and also a secure internal attachment of the tape 21a to the tubular strip along the seam, as shown in Fig. 17. The lower roll 116 is rotated positively by a chain and sprocket wheel drive 121 operatively connected to the shaft 32 of the belt pulley 29 driven by the chain drives 36 and 37, speed reducer 38 and electric motor 40. The arrangement facilitates drawing or pulling the strip 20 and tape 21a progressively, that is continuously through the folding structure 61 and threading element 70 and past the cutters 93, 94 and the rollers 111, 112 without objectionable slackness or undue tension and in accordance with the travel of the belt 27 and the rate of folding and trimming of the strip 20.

At the seam-compacting means 114 the folded strip 20 and tape 21a are fully and integrally united to constitute the completed continuous tube or tubing 21 of flattened shape with an internal tape 21a reinforcement along the longitudinal butt-seam. The severed continuous marginal portions 20a, 20b where they leave the cutters 93, 94 in a joined condition, may be conducted from the cutters over a driven pulley 122 mounted for rotation on an axle 123 carried by the mounting members 119, 119 so that the pulley 122 contacts and is driven by the upper roll 115, and then the severed marginal portions 20a, 20b may be deposited in a suitable waste-receiving receptacle (not shown).

The continuous tube 21 is desirably wound into convolutions to form a roll of tube-stock, and this may be accomplished by power-driven wind-up means 124 carried by the frame 23 at a suitable position beyond the seam-compacting means 114 and in the particular apparatus shown, at the opposite end from the means 114 and below the roll of strip 20. To prevent the convolutions of the continuous tube 21 from adhering one to the other because of the tackiness of the unvulcanized rubber material, the entire exterior of the continuous tube 21 is desirably treated with adhesion-preventing material such, for example, as dry zinc stearate powder 125 retained in a suitable metal tray 126 supported by the lower shelf 26 and spaced from each end of the apparatus.

It will be noted that the continuous tube 20 is trained about the lower roll of the means 114 and passes under tension beneath a pressure pulley 127 and over a pressure pulley 128 adjacent one end of the tray 126, as shown in Fig. 1, both pulleys being mounted for rotation and carried by the lower shelf 26 and functioning to compact further the longitudinal butt-seam of the tube 21. From the pressure pulley 128 the tube 21 is passed beneath spaced-apart rotatable pulleys 129, 130 arranged to conduct the tube 21 submerged through the zinc stearate, and then upwardly out of the tray 126 and over a rotatable pulley 131 at the other end of the tray. The continuous tube 21 passes from the pulley 131 underneath a tube-tensioning pulley 132 and to the wind-up means 124, the pulley 132 being rotatably mounted on one end of a lever 133 pivotally mounted at its other end on the case of a variable speed transmission 134 below the lower shelf 26, the driving speed of the transmission 134 being controlled by the angular position of the pulley 132 and lever 133. The pulley 132 and lever 133 can swing vertically to maintain tension in the tube 21 and effect changes in driving speed of the transmission 134 as the size of the wound roll of tube 21 changes.

The wind-up means 124 includes a shaft 135 rotatably mounted on the frame 23 for detachably carrying the roll of continuous tube 21 and driven by a chain and sprocket wheel drive 136 connected operatively to a speed-reducer 137 secured to the lower shelf 26 and driven by a chain and sprocket wheel drive 138 connected to the variable speed transmission 134. The transmission 134 may be of the hydraulically operated type and is supported below the speed-reducer 137 by the lower shelf 26 and is connected through suitable shaft and coupling means 139 to a second electric motor 140 also supported below the lower shelf 26.

The power-driven wind-up means 124 and the cantilever-mounted vertically swinging pulley 132 coact to maintain the continuous tube 21 in a taut, tensioned condition beyond the seam-compacting means 114 and to continuously wind the tube 21 into a roll of stock in accordance with the rate of delivery of the tube 21 from the seam-compacting means 114 and also in accordance with the increase in diameter of the roll of stock of continuous tube 21. At the same time, the speed of rotation or rate of travel of the conveyor belt 27 and the speed of rotation of the rolls 115, 116 of the seam-compacting means 114 establish the rate at which the strip 20 is drawn off its roll at the receiving end of the belt, formed and folded into the continuous tubular shape and trimmed and seamed to exact diameter. Also, they establish the rate at which the tape 21a is inserted into and applied to the tubular strip 20 and at which the tape-reinforced butt-seam is compacted subsequently so as to deliver the completed continuous tube 21 from the means 114 for subsequent treatment and wind-up.

For independently controlling each electric motor 40 and 140, a suitable electric safety switch 141 of the foot-operated type may be provided and connected by leads 142, 143 to the motors and connected to a suitable source of electric power (not shown). The infra-red ray lamp 60 is also to be connected to the source of electrical power.

The procedural aspects of the invention are best practiced when using the hereinabove described apparatus. Assuming the electric motors 40 and 140 to be energized and driving the several mechanisms of the apparatus in its condition shown in Fig. 1, the continuous strip 20 is unreeled from its roll on the pedestals 22, 22 and supplied continuously and progressively to the shaping and folding structure 61 at a rate substantially equal to the speed of travel (about 15 feet per minute) of the conveyor belt 27. However, the strip 20 as it is unreeled normally has adhesion-preventing (zinc stearate) powder on its face 20c, 20d which powder must be removed from the face 20c at the marginal portions 20a, 20b so that they can be adhesively joined subsequent to the folding operation.

To these ends the strip 20 passes beneath the cylindrical roller 42 in frictional driven contact with the upper reach 28 of the conveyor belt 27 so as to unreel and feed the strip 20 face 20c uppermost progressively to the solvent-applying means 41. At the means 41 the strip 20 in taut condition is looped about the idler roll 47 and passed therefrom partially about and in contact with the solvent-moistened peripheral surfaces 51, 52 of the felt wheel 49 and then to the driving roller 55. Thus, the zinc stearate powder is removed from the face 20c of the strip at its marginal portions 20a, 20b and the rubber material of the face 20c at the marginal portions 20a, 20b is cleaned, moistened and tackified by the solvent applied to the strip at the wheel 49.

The driving roller 55 maintains the strip 20 face 20c uppermost in frictional driven contact against the upper reach 28 of the conveyor belt so as to facilitate maintaining the strip in taut condition between the roller 42 and the roller 55 and to facilitate progressively, that is continuously feeding the strip at the desired rate to the shaping and folding structure 61 without objectionable slippage between the strip and the conveyor belt.

The strip 20 in its marginally cleaned, flat condition travels with the conveyor belt 27 in supported relation thereto from the driving roller 55 to the hopper 58, where the thin layer of soapstone 59 is applied to the side portions of the face 20c of the strip 20 between the cleaned marginal portions 20a, 20b, and then travels to the infra-red ray lamp 60, where any remaining liquid solvent on the marginal portions of the strip is vaporized. This facilitates the provision of dry tacky-rubber faces 20c of the marginal portions before delivery of the strip 20 to the shaping and folding structure 61. The strip 20 travels with the belt 27 beyond the lamp 60 and then into the mouth of the folding structure 61 at its strip-receiving end 62.

Under the influence of the pushing force exerted by the belt on the flat strip 20 combined with the pulling force exerted by the rotating pressure-applying rolls 115, 116 of the seam-compacting means 114 on the strip in its flattened tubular condition, the strip 20 is drawn and compelled to move progressively, that is continuously through and beyond the shaping and folding structure 61. As a result of the functioning of the structure 61 together with the continuous movement of the strip 20 through the structure 61, the strip has its side portions between and adjacent the marginal portions 20a, 20b progressively folded over in an upwardly curved manner toward one another, while at the same time, the marginal portions 20a, 20b of the strip are progressively bent upwardly and outwardly relative to the adjacent side portions so as to be disposed in overlapping, closely adjacent, face 20c-to-face 20c, substantially parallel relation one to the other. Such folding and bending alters the initial flat shape of the strip 20 to a longitudinally divided tubular shape of substantially circular cross-section with upstanding, overlapping, radially outward extensions at the divide, the extensions being constituted by the marginal portions 20a, 20b in their outwardly overlapping, closely spaced disposition.

The strip 20 in its longitudinally divided tubular condition is drawn from the strip-delivery end 63 of the structure 61 and passes to the rotary cutters 93, 94 where the overlapping, upstanding marginal portions 20a, 20b are simultaneously and progressively, that is continuously pressed tightly and laterally together at or adjacent the inner peripheral surface of the tube, as shown in Figs. 11 and 12, in adhered line-contacting relation and simultaneously and progressively, that is continuously severed longitudinally at a position thereon to provide a continuous tube of substantially circular cross-section and uniform diameter having a longitudinally continuous seam along the joined cut-edges of the marginal portions. The severed parts of the marginal portions are continuously removed from the vicinity of the tubular strip. Under the influence of the pulling force, the tubular strip 20 as it moves beyond the cutting station, is progressively changed from the circular shape to a relatively less circular shape, while the joined cut-edges at the seam progressively swing about their line of joinder into abutting, edge-to-edge, adhered contact, that is an edge-on abutment, to provide a longitudinal butt-seam 21b of the continuous tube.

The continuous reinforcing tape 21a is inserted centrally into the space of the strip 20 in its longitudinally divided tubular condition at the strip-delivery end 63 of the structure 61 by virtue of the functioning of the threading element 70, and is supplied by the functioning of the tape-feeding means 71 at a rate consistent with the rate of folding and forming the strip 20 into its tubular shape and of severance of the marginal portions 20a, 20b. The strip 20 in its tubular seamed condition and the tape 21a therein travel together to and over the rollers 111, 112 where the tubular strip is flattened and the tacky surface of the tape 21 is pressed into adhered relation against the tacky rubber face 20c of the internal wall of the flattened tube centrally along the longitudinal butt-seam.

The flattened tubular strip and tape assembly passes next to the seam-compacting means 114 where the rolls 115, 116 apply sufficient pressure to the assembly to compact the rubber material of the abutting cut-edges intimately together and to adhere further the tape 21a across its width to the internal wall of the flattened tube, all of which provides a secure, reinforced, thin butt-seam continuously along the tube. The seam is further compacted and strengthened as the flattened, unitary tube and tape assembly passes under tension over the pressure pulleys 127, 128 to the tray 126, where a thin coating of zinc stearate powder is applied to the exterior of the tube before the tube and tape assembly is wound under tension into roll form at the wind-up means 124.

The modified construction 145 shown especially in Fig. 19 differs from the apparatus shown in Figs. 1 to 17 in that it is arranged to apply the reinforcing tape 21a to the exterior of the continuous tube along its butt-seam 21b to produce the modified continuous tube 144 shown in Fig. 20, which exterior reinforcement requires clean tacky-rubber surfaces at the under face 20d of the marginal portions 20a, 20b of the strip 20. A second solvent-apply means 146 is provided adjacent the strip-receiving end 62 of the shaping and folding structure 61 and comprises a shallow solvent-containing tray 147 overlying and extending across the upper reach 28 of the conveyor belt 27, and a pair of laterally spaced-apart moistener rolls 148, 148 mounted in the tray 147 for rotation and mounted on a shaft 149 rotatably supported by the tray with a driving wheel 150, 150 at each end of the shaft beyond the tray in frictional driven contact with the upper reach 28 of the belt. The continuous strip 20 passes from the belt over the moistener rolls 148, 148 which apply liquid solvent to and clean the marginal portions 20a, 20b at the under face 20d of the strip, and then the strip 20 enters the mouth of the folding structure 61 without again contacting the conveyor belt 27. Thus both faces 20c, 20d of the marginal portions 20a, 20b are clean and tackified for the folding, severing and seaming operations.

Instead of the tape 21a passing through the structure 61 and being threaded into the interior of the tube, the tape passes from the guide and pin means 91 of the tape-feeding means 71 in a 180° twist and above the rotary cutters 93, 94 but between the shafts 96, 97 thereof to the rollers 111, 112 where the tape 21a is applied and adhered to the butt-seam 21b of the tubular strip as it is flattened. It will be noted that the relative positions of the rollers 111, 112 are reversed from that shown in Fig. 1 in that roller 111 is uppermost, so that as the tubular strip flattens and passes over the roller 112, the tape 21a contacts and adheres to the strip at its exterior centrally along and overlying the butt-seam 21b. If desired, suitable guide means or transversely spaced rollers (not shown) may be provided at the roller 111 for centering the tape relative to the tubular strip.

Variations may be made without departing from the scope of the invention as it is defined in the following claims.

I claim:

1. Apparatus for building continuous tubing from a continuous flat strip of flexible self-adherent sheet material, said apparatus comprising means including a troughed laterally curved in section strip-engaging surface for forming said continuous flat strip including marginal portions thereof continuously into continuous tubing having a longitudinally divided tubular shape with said marginal portions projecting outwardly in face-to-face spaced-apart relation one to the other along the divide, means including a rotary disc cutter disposed adjacent and exteriorly of the tubing and rotatable in a plane extending generally normal to and intersecting the projecting marginal portions for severing continuously part of each projecting marginal portion so as to provide uniformly cut outwardly facing marginal edges of the tubing along its divide and for pressing continuously together said outwardly facing marginal edges so as to unite them at the inner surface of the tubing in substantially line-contacting side-by-side adhered relation whereby wall portions of the tubing adjoining the united marginal edges are interconnected, means for depressing and flexing continuously said wall portions of the tubing so as to swing said united marginal edges about their line of joinder into edge-on abutting adhered relation to provide a continuous annular wall of the tubing having a longitudinally-extending continuous butt-seam, means for applying a continuous strap reinforcement of flexible self-adherent sheet material continuously at a position beyond said rotary disc cutter to a face of said annular wall of the tubing in overlapping adhered relation to said wall portions thereof and along said butt-seam, said strap reinforcement being relatively narrow as compared to the width of the tubing, and means for applying pressure continuously to said wall portions and the abutting marginal edges of the tubing and to said strap reinforcement to compact and securely unit the wall material of the tubing and the material of said strap reinforcement along said butt-seam.

2. Apparatus for building continuous tubing from a continuous flat strip of flexible self-adherent sheet material, said apparatus comprising means including an elongate, troughed, laterally curved in section strip-receiving and engaging element for folding said strip continuously into the form of continuous longitudinally-divided tubing, means for trimming continuously opposite side margins of the folded strip at its divide to provide uniformly cut marginal edges thereof and for bringing said marginal edges together continuously in edge-on abutting adhered relation one to the other so as to provide continuous tubing having a continuous annular wall with a longitudinally-extending continuous butt-seam, and means for applying and adhering a continuous strap reinforcement of flexible self-adherent sheet material continuously at a position spaced beyond the second said means to a face of said annular wall of the tubing along and in overlapping relation to said butt-seam thereof, said strap reinforcement being relatively narrow as compared to the width of the tubing.

3. A machine for automatically manufacturing continuous tubing from a continuous flat strip of thin flexible self-adherent sheet material, said machine comprising power-operated means including a rotatable endless belt conveying element operable to transport and continuously advance said continuous flat strip at a substantially uniform linear rate to a delivery position of the conveying element, stationary tubular, laterally curved in section, elongate forming means adjacent said delivery position in alignment with said conveying element for receiving therefrom and enclosing and shaping said continuous flat strip including marginal portions thereof continuously into continuous tubing having initially a longitudinally divided tubular shape with said marginal portions projecting outwardly of the tubing in face-to-face spaced-apart relation one to the other along the divide, a pair of power-operated cooperating rotary disc cutters outside of the tubing and rotatable in a plane adjacent and extending across the tubing for severing continuously part of each projecting marginal portion so as to provide uniformly cut outwardly facing marginal edges of the tubing along its divide while at the same time pressing continuously together said outwardly facing marginal edges so as to unite them at the inner surface of the tubing in substantially line-contacting side-by-side adhered relation to interconnect wall portions of the tubing adjoining the united marginal edges, means including a threading element mounted on and within the tubular forming means for inserting a continuous tape reinforcement of thin flexible self-adherent sheet material relatively narrower than said strip continuously into the space of the tubing at a position therein beyond said rotary disc cutters and in alignment with said united marginal edges, means spaced from said rotary cutters for depressing and flexing continuously said wall portions of the tubing so as to swing said united marginal edges about their line of joinder into edge-on abutting adhered relation while at the same time applying continuously said tape reinforcement to said wall portions at the inner faces thereof in overlapping adhered relation thereto and to the abutting marginal edges, and power-operated rotary roller means spaced from the wall-depressing and tape-applying means for applying pressure continuously to said wall portions including said abutting marginal edges and to said tape reinforcement so as to compact and securely unite the material thereof.

4. A machine as defined in claim 3 in which said stationary forming means comprises a hollow shaping and folding structure including therethrough a troughed strip-shaping surface having sufficient dimensions and a generally and laterally curved-in-section shape for folding said continuous flat strip during its passage through said structure continuously into continuous tubing of longitudially divided generally cylindrical shape while bending continuously said marginal portions of the strip so that they project outwardly of the tubing in said face-to-face spaced-apart relation one to the other along the divide.

5. A machine for automatically manufacturing continuous tubing from a continuous flat strip of thin flexible self-adherent sheet material, said machine comprising power-operated means including a rotatable endless conveyor belt for transporting and continuously advancing said continuous flat strip to a delivery position of said conveyor belt, means for feeding said continuous flat strip onto said conveyor belt, means positioned along the course of said conveyor belt for continuously applying a cleaning agent to opposite marginal portions of the moving flat strip at a face thereof to enhance the self-adherent properties of both said marginal portions and for continuously applying adhesion-preventing material to the moving flat strip at said face thereof intermediate said marginal portions, a stationary hollow shaping and folding structure including a troughed laterally curved-in section shaping surface therethrough disposed at said delivery position in alignment with said conveyor belt for receiving therefrom and enclosing and shaping said continuous flat strip including said marginal portions continuously into continuous tubing having initially a longitudinally divided generally cylindrical shape with said marginal portions projecting outwardly of the tubing in face-to-face spaced-apart relation one to the other along the divide, a pair of power-operated cooperating rotary disc cutters adjustable relative to said shaping and folding structure and disposed outside of and adjacent the tubing and rotatable in a plane generally perpendicular to the vertical median plane of the tubing for severing continuously each projecting marginal portion so as to provide uniformly cut outwardly facing marginal edges and so as to unite them at the inner surface of the tubing in substantially line-contacting side-by-side adhered relation to interconnect wall portions of the tubing adjoining the united marginal edges, means for feeding a tape reinforcement of thin flexible self-adherent sheet material relatively narrower than said flat strip continuously onto the tubing at a face thereof and in alignment with said united marginal edges, means including spaced-apart and offset roller elements spaced from said rotary disc cutters for depressing and flexing continuously said wall portions of the tubing so as to swing said united marginal edges about their line of joinder into edge-on abutting adhered relation while applying continuously said tape reinforcement to said wall portions in overlapping adhered relation thereto and to the abutting marginal edges, power-operated means including adjustable rotary rolls spaced from the wall-depressing and tape-applying means for flattening the tubing and applying pressure continuously to said wall portions including said abutting marginal edges and to said tape reinforcement so as to compact and securely unite the material thereof, and power-operated windup means for winding continuously the flattened continuous tubing and tape assembly into roll form having convolutions of the flattened tubing assembly superimposed one upon the other.

6. The method of building continuous tubing having a longitudinally-extending butt-seam, which method comprises the steps of continuously advancing and forming a continuous flat strip of flexible self-adherent sheet material including marginal portions thereof continuously into continuous tubing having initially a longitudinally divided tubular shape with said marginal portions projecting outwardly in face-to-face spaced-apart relation one to the other along the divide, severing continuously and simultaneously part of each projecting marginal portion to provide uniformly cut outwardly facing marginal edges of the tubing along its divide, pressing continuously together said outwardly facing marginal edges to unite them at the inner surface of the tubing in substantially line-contacting side-by-side adhered relation thereby interconnecting wall portions of the tubing adjoining the united marginal edges, depressing and flexing continuously said wall portions of the tubing so as to swing said united marginal edges about their line of joinder into edge-on abutting adhered relation to provide a continuous annular wall of the tubing having a longitudinally-extending continuous butt-seam, applying continuously a continuous strap reinforcement of flexible self-adherent sheet material to a face of said annular wall of the tubing in overlapping adhered relation to said wall portions thereof and along said butt-seam, and applying pressure continuously to said wall portions and the abutting marginal edges of the tubing and to said strap reinforcement to compact and securely unite the wall material of the tubing and the material of said strap reinforcement along said butt-seam.

7. The method of automatically making continuous tubing having a longitudinally extending butt-seam, which method comprises the steps of continuously advancing at a substantially uniform linear rate a continuous flat strip of flexible self-adherent sheet material including marginal portions thereof, forming the advancing continuous flat strip continuously into continuous tubing of longitudinally divided tubular shape with said marginal portions projecting radially outwardly in face-to-face spaced-apart relation one to the other along the divide, severing continuously and simultaneously each projecting marginal portion to provide uniformly cut outwardly facing marginal edges of the tubing along its divide while at the same time pressing continuously together said outwardly facing marginal edges to unite them at the inner surface of the tubing in substantially line-contacting adhered relation thereby interconnecting wall portions of the tubing adjoining the united marginal edges, inserting a continuous tape reinforcement of flexible self-adherent sheet material relatively narrower than said strip continuously into the space of the tubing in alignment with said united marginal edges, depressing and flexing continuously said wall portions of the tubing so as to swing said united marginal edges about their line of joinder into edge-on abutting adhered relation while the same time applying continuously said tape reinforcement to said wall portions at the inner face thereof in overlapping adhered relation thereto and to the abutting marginal edges, and applying pressure continuously to said wall portions including said abutting marginal edges and to said tape reinforcement to compact and securely unite the material thereof.

8. A method as defined in claim 7 in which the continuous tubing and tape reinforcement assembly is flattened continuously while applying pressure continuously to said wall portions and the abutting marginal edges of the tubing and to said tape reinforcement to compact and securely unite the material thereof.

9. A method as defined in claim 8 in which a cleaning agent is applied continuously and simultaneously to both said marginal portions of said continuous strip at a face thereof to enhance the self-adherent properties thereof, and an adhesion-preventing material is applied continuously to said continuous flat strip intermediate the cleaned faces of the marginal portions thereof, all before forming the strip continuously into the longitudinally-divided continuous tubing.

10. Apparatus for building continuous tubing from an initially flat strip of flexible self-adherent sheet material, said apparatus comprising guide means for shaping the strip into a longitudinally divided tubular body portion with marginal flange portions projecting radially outwardly along the divide, means for pressing said flange portions together in face-to-face relation one to the other, a cutter element acting in a plane transverse to said flange portions for severing the flange portions from said tubular body portion and joining the cut edges of the tubular body portion in line-contacting relationship, means spaced from said cutter element for advancing the strip, there being a free reach of the tubularly formed strip with the joined cut edges extending from said cutter element toward said advancing means, and tube spreading means disposed within said advancing free reach intermediate said cutter element and said advancing means, said tube spreading means spreading and flattening said tubularly formed strip in said transverse plane to swing the line-contacting cut edges thereof into edge-on self-adhered relationship to provide a continuous butt seam along the flattened tubing.

11. Apparatus for building continuous tubing from an initially flat strip of flexible self-adherent sheet material, said apparatus comprising guide means for shaping the strip into a longitudinally divided tubular body portion with marginal flange portions projecting radially outwardly along the divide, means for pressing said flange portions together in face-to-face relation one to the other, a cutter element acting in a plane transverse to said flange portions for severing the flange portions from said tubular body portion and joining the cut edges of the tubular body portion in line-contacting relationship, means spaced from said cutter element for advancing the strip, there being a free reach of the tubularly formed strip with the joined cut edges extending from said cutter element toward said advancing means, and tube spreading means disposed within said advancing free reach intermediate said cutter element and said advancing means, said tube spreading means spreading and flattening said tubularly formed strip in said transverse plane to swing the line-contacting cut edges thereof into edge-on self-adhered relationship to provide a continuous butt seam along the flattened tubing, and said advancing means further flattening the flattened tubing in the same transverse plane.

12. Apparatus for building continuous tubing from an initially flat strip of flexible self-adherent sheet material, said apparatus comprising guide means for shaping the strip into a longitudinally divided tubular body portion with marginal flange portions projecting radially outwardly along the divide, means for pressing said flange portions together in face-to-face relation one to the other, a cutter element acting in a plane transverse to said flange portions for severing the flange portions from said tubular body portion and joining the cut edges of the tubular body portion in line-contacting relationship, means including opposed rolls spaced from said cutter element for advancing the strip, there being a free reach of the tubularly formed strip with the joined cut edges extending from said cutter element toward said advancing means, and tube spreading means disposed within said advancing free reach intermediate said cutter element and said advancing means, said tube spreading means spreading and flattening said tubularly formed strip in said transverse plane to swing the line-contacting cut edges thereof into edge-on self-adhered relationship to provide a continuous butt seam along the flattened tubing, said opposed rolls further flattening the flattened tubing in the same transverse plane and compacting said butt seam.

13. The method of building continuous tubing having a longitudinally extending butt seam, which method comprises the steps of continuously advancing and shaping a continuous flat strip of flexible self-adherent sheet material into a longitudinally divided tubular body portion with marginal flange portions projecting radially outwardly along the divide in face-to-face spaced-apart relation, severing the projecting flange portions from the tubular body portion in a plane transverse to said flange portions and pressing together and uniting the cut edges of the tubular body portion in line-contacting relationship at its inner surface, thereafter spreading and flattening the tubularly formed strip in said transverse plane thereby swinging the line-contacting cut edges of the tubularly formed strip into edge-on abutment to produce a continuous butt seam along the flattened tubing.

14. The method of building continuous tubing having a longitudinally extending butt seam, which method comprises the steps of continuously advancing and shaping a continuous flat strip of flexible self-adherent sheet material into a longitudinally divided tubular body portion with marginal flange portions projecting radially outwardly along the divide in face-to-face spaced-apart relation, simultaneously severing the projecting flange portions from the tubular body portion in a plane transverse to said flange portions and pressing together and uniting the cut edges of the tubular body portion in line-contacting relationship at its inner surface, thereafter spreading and flattening the tubularly formed strip in said transverse plane thereby swinging the line-contacting cut edges of the tubularly formed strip into edge-on abutment to produce a continuous butt seam, and subsequently further flattening the flattened tubularly formed strip in the same transverse plane.

15. The method of building continuous tubing having a longitudinally extending butt seam, which method comprises the steps of continuously advancing and shaping a continuous flat strip of flexible self-adherent sheet material into a longitudinally divided tubular body portion with marginal flange portions projecting radially outwardly along the divide in face-to-face spaced-apart relation, simultaneously severing the projecting flange portions from the tubular body portion in a plane transverse to said flange portions and pressing together and uniting the cut edges of the tubular body portion in line-contacting relationship at its inner surface, thereafter spreading and flattening the tubularly formed strip in said transverse plane thereby swinging the line-contacting cut edges of the tubularly formed strip into edge-on abutment to produce a continuous butt seam, and subsequently further flattening the flattened tubularly formed strip in the same transverse plane while compacting the continuous butt seam.

References Cited in the file of this patent

UNITED STATES PATENTS

| | | |
|---|---|---|
| 1,721,975 | Sanderson | July 23, 1929 |
| 2,169,936 | Wagner | Aug. 15, 1939 |
| 2,272,343 | Kelly | Feb. 10, 1942 |
| 2,455,349 | Baymiller | Dec. 7, 1948 |
| 2,506,916 | Bishop | May 9, 1950 |
| 2,592,336 | Rejeski | Apr. 8, 1952 |